_United States Patent_ [19]

Aguirre

[11] 3,917,340

[45] Nov. 4, 1975

[54] SHADE

[76] Inventor: Everardo Machuca Aguirre, Cocateros 211, Co. Nueva Santa Maria, Mexico 16, D.F.

[22] Filed: Oct. 15, 1974

[21] Appl. No.: 514,919

[30] Foreign Application Priority Data
June 11, 1974 Mexico ............................... 151777

[52] U.S. Cl. ............................ 296/137 R; 160/184
[51] Int. Cl.² ............................................ B60J 7/10
[58] Field of Search ......... 296/137 R, 136; 160/184, 160/368 S; 98/2

[56] References Cited
UNITED STATES PATENTS

| | | |
|---|---|---|
| 2,643,912 | 6/1953 | Lyon ................................ 296/137 R |
| 3,328,074 | 6/1967 | Rossem ........................... 296/137 R |
| 3,476,032 | 11/1969 | Mattly ............................. 296/137 R |

_Primary Examiner_—Robert R. Song
_Attorney, Agent, or Firm_—Michael S. Striker

[57] ABSTRACT

A shade, for shading mobile vehicles or the like from weather conditions such as the rays of the sun, is formed with a plurality of sheet material pieces accommodated on a support structure which is in turn located on the roof of a mobile vehicle. The shade further provides passages for moving air to pass through when the vehicle is in motion so that the shade will offer minimum air resistance to impinging air flowing opposite to the direction of motion.

9 Claims, 3 Drawing Figures

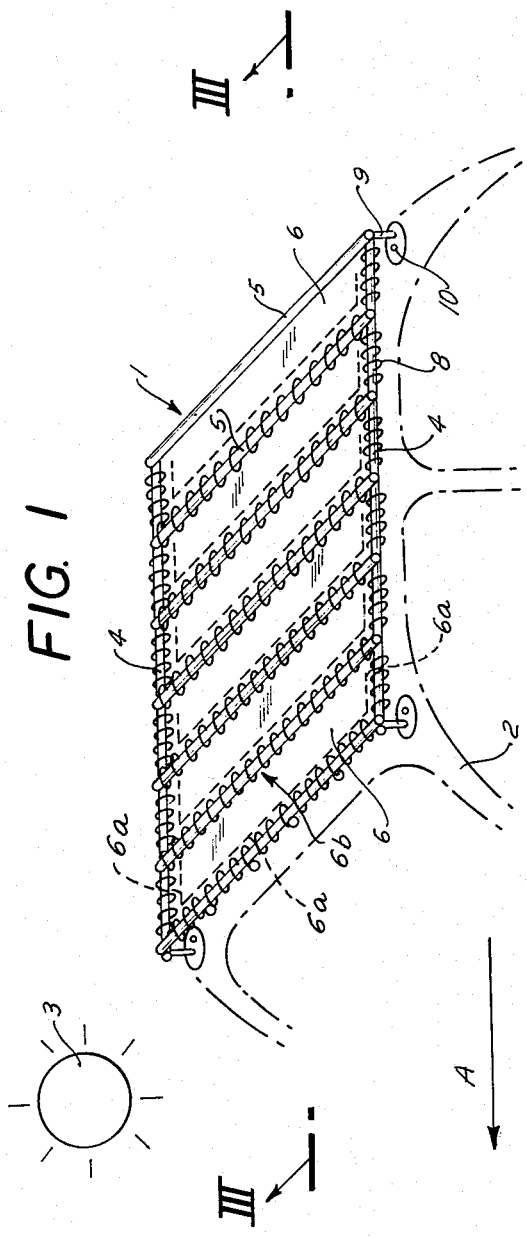
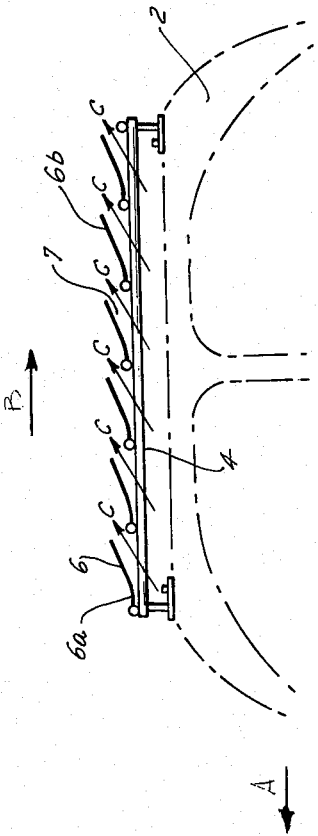
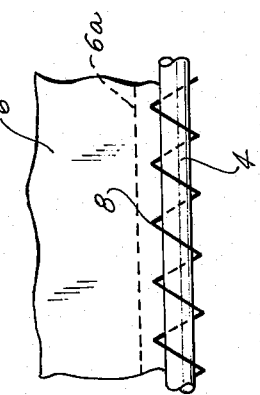

SHADE

BACKGROUND OF THE INVENTION

The present invention relates to a shade for shading mobile vehicles or the like from weather conditions such as the rays of the sun, and more particularly to a portable shade which can be mounted upon the roof of a vehicle.

It is commonly known that when a vehicle is generally exposed to the direct rays of the sun that the interior region of the automobile develops extraordinarily high temperatures. Temperatures greater than 130°F. are easily obtainable because of the smallness of the interior region inside the vehicle, and further due to the transfer of the heat from the direct rays of the sun to the metal roof of the vehicle by means of conduction.

Such high temperatures result in many harmful effects. For example, the cloth fabric of the seats provided in the interior of the vehicle are caused to deteriorate at a higher rate, due to the presence of the higher heat. Accordingly, higher heat dissipation fabrics are resorted to which can be quite costly. Furthermore, the steering wheel may become too hot to handle, thus causing a long waiting time before an operator can operate the vehicle. The inside temperature may be so uncomfortable to the operator that he may be caused to wait for the heat to dissipate, or alternatively he may be required to operate an internal air-cooling unit, if one is available. This will cause a heavy current drain on the battery, especially if the car has not yet been placed in motion; thus contributing to an overloading of the vehicle's starting system, as well as contributing to general wear and tear of the vehicle.

The prior art has attempted to solve this problem by providing the aforementioned air-cooling units and/or by providing tinted-glass windows. The air-cooling units have numerous disadvantages, such as being bulky, complex and costly to operate. These air-cooling units drain the energy from the vehicle's driving system and require additional fuel from the vehicle's fuel system which would otherwise be advantageously used for the operation of the engine. The added complexity of an air-cooling system which requires substantial amounts of energy is, of course, a substantial and costly burden in an energy-shortage situation.

Tinted-glass windows are known in the prior art to cool the inside of motor vehicles by screening out a portion of the rays of the sun. However, such tinted-glass has many disadvantages. First, the tinted-glass is very costly and difficult to manufacture. Secondly, and more importantly, the tinted-glass reduces the operator's range of vision. At night or when an older driver is operating the car and vision is already reduced, a tinted-glass window is a distinct safety hazard.

SUMMARY OF THE INVENTION

Accordingly, it is the general object of the present invention to overcome the disadvantages of the prior art.

More particularly, it is an object of the present invention to provide a shade to shade mobile vehicles from the rays of the sun.

Another object of the present invention is to provide such a shade which is portable and mountable on the roofs of vehicles.

A further object of the present invention is to provide means for the shade to offer minimum air resistance to impinging air flowing opposite to the direction of motion.

In keeping with these objects, and others which will become apparent hereafter, one feature of the present invention is the provision of a plurality of sheet material pieces, each having a first portion which is attached to a support structure mounted on the roof of the vehicle, and a second portion which is unattached to the support structure, so that each of the sheet material pieces may form a passage for moving air to pass through when the vehicle is in motion.

This basic feature overcomes the disadvantages of the prior art in a simple and efficient manner. The shade eliminates the need for energy-draining air-cooling units, and further eliminates the need for tinted glass windows with their associated safety hazards. The shade serves as a protective layer to screen out the rays of the sun before the rays impinge directly on the roof of the vehicle. Consequently, the heat will be reflected and/or absorbed into the ambient atmosphere.

It is a further feature of the present invention that the sheet material pieces can be made of fabric, cloth, plastic, or even flexible metal, or other material.

It is a further feature of the present invention that the sheet material pieces may be fastened by means of thread sewn along a seam in the sheet material pieces which surrounds portions of said support structure, so as to fasten the sheet-material piece to the support structure.

It is an additional feature of the present invention that the unattached second portions will provide a passage when the car is in motion, for air to pass through. The sheet material pieces will typically be supported by the support structure in a plane substantially parallel to the plane of the roof of the vehicle when the vehicle is at rest. When the vehicle is in motion, air will be forced along the top of the sheets along the upper surface of the sheet material pieces. At this time, the unattached second portion of the sheet material pieces will be elevated to a position higher than its original resting position, due to the air that is being forced over the upper surface of the sheet material pieces. The faster velocity of the air that is being forced over the upper surface of the sheet material pieces relative to the slower-moving air located below the lower surface of the sheet material pieces, will create an underpressure area over the top surface. This underpressure area will pull the sheet material pieces to the aforementioned elevated position by reason of the well-known Bernoulli effect.

Effectively, each of the sheet material pieces forms a passage through which oncoming air is allowed to escape. This allows the vehicle to proceed with minimum air friction resistance caused by the external presence of the shade.

It is an additional feature of the present invention that the support structure may be made of metal or plastic material or other materials.

The support structure may be formed of at least two transversely spaced rod-like members with its axis lying directly in the direction of motion Each member is provided with feet at both ends to mount the support structure on the roof of the vehicle by suitable securing means, such as screws, rivets or the like. Cross-ties may be further connected to and spaced along the rod-like members parallel to the direction of motion, so as to provide a rigid structure.

It is an additional feature of the present invention that the support structure may be dimensioned to roughly approximate the dimensions of the roof top of the vehicle. In other words, as the size of the vehicle, and consequently, the roof of the vehicle increases, so should the size of the support structure increases, so as to effectively shade a major portion of the surface area of the roof of the vehicle. The structure is so simple that a variety of sizes can readily be kept in stock.

The novel features which are considered as characteristic for the invention are set forth in particular in the appended claims. The invention itself, however, both as to its construction and its method of operation, togethehr with additional objects and advantages thereof, will be best understood from the following description of specific embodiments when read in connection with the accompanying drawing.

BRIEF DESCRIPTION OF THE DRAWING

FIG. 1 is a diagrammatic perspective view of an embodiment according to the present invention;

FIG. 2 is an enlarged scale version of a fragmentary section showing in detail the fastening means by which the sheet material pieces are attached to the support structure; and FIG. 3 is a side view of FIG. 1 along the line III—III after the vehicle has been placed in motion.

DESCRIPTION OF THE PREFERRED EMBODIMENTS

Discussing the apparatus which has been illustrated in an exemplary embodiment in FIGS. 1–3, it will be seen that reference numeral 1 is the shade which shades a mobile vehicle 2 from the direct rays of the sun 3. The shade 1 operates as follows; the sheet material pieces 6 provide a protective layer shielding the vehicle 2 from the rays of the sun 3. By thus screening the rays of the sun 3, the interior temperature of the vehicle 2 will not substantially rise. The screen may reflect and/or adsorb the rays of the sun.

The support structure 4, 5 is provided on the vehicle 2 and is supported by the feet 9 whicih are secured to the vehicle 2 by means of screws or rivets 10, or of other suitable fasteners.

The support structure 4, 5 has at least two transversely spaced elongated members 4. The members 4 may be made of metal or plastic or of any other similar sturdy material. The members 4 are preferably rod-shaped and the axis of each member lies in the direction of the motion shown as the arrow A. Each member 4 is divided into a plurality of sections along its length.

The support structure 4, 5 further has a plurality of cross-tie members 5 connected to and spaced along said elongated members 4. The cross-tie members are preferably rod-shaped and the axis of each cross-tie member is substantially perpendicular to the direction of motion A. The connection preferably occurs at the transversely spaced end portions of each of the cross-tie members 5, either by soldering, by welding or by other fastening devices such as screws, rivets, or tapped sleeves.

The plurality of sheet material pieces 6 are preferably made of any suitable fabric, cloth, plastic or flexible metal. The pieces 6 are generally accommodated on the support structure 4, 5, each having a first portion 6a which is attached to the elongated members 4 and to one of the cross-tie members 5, and a second portion 6b which is unattached to the support structure 4, 5. The sheet material pieces 6 lie in a plane substantially parallel to the plane of the roof of the vehicle 2 when the vehicle 2 is not in motion. When the vehicle 2 is placed in motion in the direction of arrow A, external atmospheric air will be forced in the direction shown by the arrow B. The underpressure region caused by air flowing in the direction B across the upper surface of the sheet material pieces by reason of the Bernoulli effect, will cause a flow of air in the direction of arrow C. Air flowing in the direction of arrow C, therefore is allowed to escape through the passage 7; thereby, offering minimum air resistance when the vehicle 2 is moving in the direction A.

FIG. 2 is an enlarged-scale of a fragmentary section showing a detail of the fastening means to illustrate how the sheet material pieces 6, and more particularly the first portion 6a thereof, are attached to the support structure 4, 5. The thread 8 is sewn through the fabric 6 and surrounds sections of the elongated members 4. It is understood that the fastening means shown is similarly applicable to attachment on the cross-tie members 5.

It will be understood that each of the elements described above, or two or more together, may also find a useful application in other types of constructions differing from the types described above.

While the invention has been illustrated and described as embodied in a shade, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A shade for shading mobile vehicles or the like from the rays of the sun comprising a support structure provided on the roof of said vehicle, said structure having a plurality of transversely spaced elongated members and a plurality of cross-tie members connected to and spaced along said elongated members; and a plurality of sheet material pieces accommodated on said support structure, each having a first portion attached to said elongated members and to one of said cross-tie members, and a second portion which is unattached to said support structure, so that each of said sheet material pieces forms a passage for air moving opposite to the direction of motion to pass through when said vehicle is in motion.

2. A shade as defined in claim 1, wherein said support structure further comprises securing means to secure said support structure on the roof of said vehicle at an elevated level relative to said roof, said securing means having a first member attached to said support structure, and a second member attached to said first member and said roof so as to fix the position of said support structure relative to said roof.

3. A shade as defined in claim 1, wherein said support structure is made of metal.

4. A shade as defined in claim 1, wherein each of said elongated members is rod-shaped and has an axis which lies substantially parallel to the direction of motion, and wherein each of said elongated members is divided into a plurality of sections along its length.

5. A shade as defined in claim 1, wherein each of said cross-tie members is rod-shaped and has an axis which lies substantially perpendicular to the direction of motion, and wherein said cross-tie members are welded to said elongated members.

6. A shade as defined in claim 1, wherein each of said sheet material pieces is a piece of cloth.

7. A shade as defined in claim 4, and further comprising fastening means fastening said first portion of each sheet material piece to said sections of said elongated members and to one of said cross-tie members.

8. A shade as defined in claim 7, wherein said fastening means is thread sewn through a border of said first portion and looped around said sections of said elongated members which are adjacent said border of said first portion and one of said cross-tie members.

9. A shade as defined in claim 1, wherein said sheet material pieces lie in a plane substantially parallel to the plane of the roof of said vehicle when the latter is at rest.

* * * * *